United States Patent [19]

Shomer

[11] Patent Number: 5,243,014
[45] Date of Patent: Sep. 7, 1993

[54] HOMOGENEOUS ACCELERATOR SYSTEM FOR EPOXY RESINS

[76] Inventor: John A. Shomer, 19 Hareuth Street, Hod Hasharon, Israel

[21] Appl. No.: 919,767

[22] Filed: Jul. 24, 1992

Related U.S. Application Data

[62] Division of Ser. No. 735,415, Jul. 24, 1991, Pat. No. 5,198,146.

[30] Foreign Application Priority Data

Jul. 25, 1990 [IL] Israel ..................... 095186
Nov. 13, 1990 [IL] Israel ..................... 096338

[51] Int. Cl.$^5$ .................................. C08G 65/10
[52] U.S. Cl. .................................. 528/93; 528/210; 528/211; 525/534; 525/939
[58] Field of Search ............. 528/93, 94, 210, 211; 525/534, 939

[56] References Cited

U.S. PATENT DOCUMENTS

| | | | |
|---|---|---|---|
| 4,342,674 | 8/1982 | Morgan | 523/465 |
| 4,420,604 | 12/1983 | Wallace | 528/93 |
| 4,451,591 | 5/1984 | Kozak et al. | 523/465 |
| 4,499,246 | 2/1985 | Tesson et al. | 528/94 |
| 4,689,375 | 8/1987 | Lauterbach | 528/93 |
| 4,800,222 | 1/1989 | Waddill | 528/94 |

*Primary Examiner*—John C. Bleutge
*Assistant Examiner*—Randy Gulakowski
*Attorney, Agent, or Firm*—Herbert Dubno

[57] ABSTRACT

The present invention relates to a homogeneous accelerator system for epoxy resins and to a method of curing such epoxy resins, wherein the system comprises (a) an inorganic salt which contains a nitrate ion, (b) aliphatic hydroxy compound selected from monohydric alcohols containing 1 to 10 carbon atoms in the molecule, polyhydric alcohols containing 2 to 10 carbon atoms and 2 to 4 hydroxy groups in the molecule, and poly ($C_{2-5}$ alkylene) glycols and (c) an aminophenol.

9 Claims, No Drawings

HOMOGENEOUS ACCELERATOR SYSTEM FOR EPOXY RESINS

This is a divisional of co-pending application Ser. No. 07/735,415 filed on Jul. 24, 1991 U.S. Pat. No. 5,198,146 Mar. 30, 1993.

FIELD OF THE INVENTION

The present invention relates to a homogeneous accelerator system for epoxy resins and to a method of curing epoxy resins utilizing such a system.

BACKGROUND OF THE INVENTION

Accelerators, such as aminophenol type accelerators, which are known in the art for accelerating the room temperature curing reaction of epoxy resins with amines, such as polyamines, cycloaliphatic amines and aromatic amines, have the capability of reducing the reaction time only within certain limits. An example of this type of accelerator is 2,4,6-tris(dimethylaminomethyl)phenol. It would be advantageous to be able to significantly shorten such reaction time.

SUMMARY OF THE INVENTION

The present invention accordingly provides a homogeneous accelerator system, having improved efficacy for curing epoxy resins, which comprises, (a) an inorganic salt which contains nitrate ion, (b) an aliphatic hydroxy compound selected from monohydric alcohols containing 1 to 10 carbon atoms in the molecule, polyhydric alcohols containing 2 to 10 carbon atoms and 2 to 4 hydroxy groups in the molecule, and poly($C_{2-5}$-alkylene) glycols and (c) an aminophenol accelerator. A method for curing epoxy resins utilizing such a system also forms part of the invention.

In a particular embodiment, the accelerator system provided by the invention is an aqueous homogeneous accelerator system, which comprises, in addition to water, (a) an inorganic salt which contains nitrate ion, (b) a monohydric aliphatic alcohol containing 1 to 4 carbon atoms in the molecule and (c) an aminophenol accelerator.

In another particular embodiment, the accelerator system provided by the invention is a substantially non-aqueous homogeneous accelerator system, which comprises (a) an inorganic salt which contains nitrate ion, (b) an aliphatic hydroxy compound selected from monohydric alcohols containing up to 10 carbon atoms in the molecule, polyhydric alcohols containing up to 10 carbon atoms in the molecule and 2 to 4 hydroxy groups in the molecule, and poly($C_{2-5}$-alkylene) glycols, and (c) an aminophenol accelerator. Preferably component (b) has a boiling point of >100° C. (more preferably >120° C., still more preferably >140° C.). In this particular embodiment, the term "substantially non-aqueous" is intended to convey that apart from any water of crystallization associated with component (a) and any small amounts of water (e.g. up to 5 wt. %) which may be associated with component (b), the system contains no added water. Persons skilled in the art will appreciate that this particular embodiment of the invention will be useful when the curing temperatures are expected to reach 100°–140° C., and it is desired to avoid foaming in the product undergoing curing.

In yet a further particular useful embodiment of the present invention, the systems described in the preceding paragraph may be modified by the addition of water; in this case, the provisos as to the preferably elevated boiling-point of component (b) do not necessarily apply.

According to yet another embodiment of the invention, it has been found that in certain cases epoxy resins may be advantageously cured using the homogeneous accelerator systems described herein, with the exception that aminophenol accelerator is absent from the system. Persons skilled in the art of curing epoxy resins will be able to readily determine, with a minimum of experimentation, when it is preferable that aminophenol accelerator be present in the system, and when it may be omitted. Thus, in the detailed description of the invention which follows, the skilled reader will bear in mind the possibility of omitting aminophenol accelerator, and the present specification should be construed accordingly.

DETAILED DESCRIPTION OF THE INVENTION

Without prejudice to the generality of the definition of component (a), this may for example be selected from the nitrates of ammonium, lithium, sodium, potassium, magnesium, calcium, strontium, barium and aluminum. Persons skilled in the art will be readily able to determine the suitability of any selected nitrate salt, whether listed herein or not, as well as the effective amounts, both generally and optimally, of the selected nitrate. The preferred nitrate is calcium nitrate, especially in hydrated form, e.g. the dihydrate or tetrahydrate.

In the embodiment of the system of the invention containing water, a preferred component (b) is ethanol. In the substantially non-aqueous embodiment of the system of the invention, component (b) is preferably selected from ethyleneglycol, propyleneglycol (propane-1,2-diol) and glycerol. A preferred component (c) is 2,4,6-tris(dimethylaminomethyl) phenol.

Although water is an ingredient of the system according to one embodiment of the system of the invention, it is nevertheless preferred that in this embodiment it does not constitute a major component of the system. Thus, in this embodiment, it is particularly preferred that the system of the present invention comprises a major proportion by weight of the sum of the components (a), (b) and (c), and a minor proportion by weight of water.

A presently preferred ratio by weight of components (a):(b):(c) lies within the range of 1 part (a): 1.0 to 5.0 parts (b): 0.02 to 7.5 parts (c), the amount of component (a) being calculated as nitrate ion.

Use of the homogeneous accelerator system in accordance with the present invention makes possible a substantial reduction of the curing time of epoxy resins, compared with known accelerators. By way of example only, the curing time can be reduced to 0.03 to 0.20 of the conventional curing time. Most curing times can be reduced effectively to, e.g., 3–12 minutes.

As is well known to persons skilled in the art, curing of epoxy resins requires the presence of a reagent for the epoxy component of such resins. The invention accordingly includes a composition for use in the curing of epoxy resins, which comprises a homogeneous accelerator system as defined herein in combination with a reagent for the epoxy component of epoxy resins; and a method for curing epoxy resins which is characterized by the use of a such a composition. The invention moreover includes a method for curing epoxy resins which is characterized by the use of a homogeneous accelerator system as defined herein whether component (c) is present or absent.

Reagents for resin-forming epoxy compounds ("the epoxy component") are well known to persons skilled in the art. Nonlimiting examples of such reagents are polyamines or polyaminoamides. Other accelerators which may be used include polyphenolic compounds such as bisphenol A or resorcinol, as well as, e.g., phenol, nonylphenol, salicylic acid or toluenesulfonic acid. Use of such other accelerators is preferred at low concentrations of the aminophenol accelerator, or when the aminophenol accelerator is omitted.

The present invention moreover provides a kit for use in making a cured epoxy resin which comprises discrete components (A) and (B), namely: (A) an epoxy component comprising at least one resin-forming epoxy compound in combination with ingredients (a) and (b) as defined herein; and (B) a reagent for said at least one resin-forming epoxy compound optionally comprising ingredient (c) as defined herein.

The present invention is applicable to making shaped articles, adhesives or films in situ. Therefore, in accordance with a particular embodiment of the present invention, there is provided a shaped article, adhesive or film comprising cured epoxy resins, in which the resins have been cured in situ, in the presence of a homogeneous accelerator system or kit as defined herein.

It is believed that the present accelerator system makes possible fine tuning of the time of curing epoxy resins, according to the amount of the accelerator system added to the epoxy resin. Persons skilled in the art will therefore be able to adjust the curing times of various systems of epoxy resins, depending on the end-use of the cured resins. Thus greater control of the curing of epoxy resins may be effected using the accelerator system of the present invention, than has been available in the prior art.

While the present invention does not depend for its efficacy on any particular theory of operation, nevertheless, it is presently believed that the advantageous results obtained by use of the present accelerator system may be due to the fact that it is able to simultaneously attack different sites in the epoxy resins, thus contributing to an overall very rapid curing reaction.

It will be appreciated that the accelerator system of the present invention may be composited in any suitable manner. Merely by way of example, the salt containing nitrate ion may be added to component (b) (mixed with water, and possibly also ethanol, in the aqueous embodiment), thoroughly mixed until homogeneous, then the aminophenol accelerator is added with further thorough mixing until homogeneous. In this connection, it may be noted that calcium nitrate dihydrate or tetrahydrate dissolves completely in any of the preferred examples of component (b), namely ethyleneglycol, propyleneglycol (propane-1,2-diol) and glycerol, as well as in many monohydric alcohols, other polyhydric alcohols and poly($C_{2-5}$-alkylene) glycols.

SPECIFIC EMBODIMENTS OF AQUEOUS ACCELERATOR SYSTEMS

In a certain embodiment of the invention, the system may comprise (parts by weight) 30–100 parts calcium nitrate dihydrate or tetrahydrate, 50–70 parts ethanol, 10–30 parts water and 1–10 parts 2,4,6-tris(dimethylaminomethyl)phenol. A particularly preferred composition within the scope of this embodiment, which for the present purpose will be labelled ACBT5, comprises (parts by weight) 80 parts calcium nitrate dihydrate or tetrahydrate, 60 parts ethanol, 20 parts water and 5 parts 2,4,6-tris-(dimethylaminomethyl)phenol.

In a different embodiment of the invention, the system may comprise (parts by weight) 100–300 parts calcium nitrate dihydrate or tetrahydrate, 175–350 parts ethanol, 25–100 water and 300–750 parts 2,4,6-tris(dimethylaminomethyl)phenol. A particularly preferred composition within the scope of this embodiment, which for the present purpose will be labelled ACBV-7, comprises (parts by weight) 250 parts calcium nitrate dihydrate or tetrahydrate, 175 parts ethanol, 75 parts water and 500 parts 2,4,6-tris-(dimethylaminomethyl)phenol.

SPECIFIC EMBODIMENTS OF SUBSTANTIALLY NON-AQUEOUS ACCELERATOR SYSTEMS

In a certain embodiment of the invention, the system may comprise (parts by weight) 30–100 (e.g. 50) parts calcium nitrate dihydrate or tetrahydrate, 50–200 (e.g. 75) parts propane-1,2-diol and 5–100 (e.g. 10–50) parts 2,4,6-tris(dimethylaminomethyl)phenol. In preparing this accelerator system, it is preferred to dissolve the hydrated calcium nitrate in propane-1,2-diol at 50°–120° C. The exemplary substantially non-aqueous accelerator system comprising (parts by weight) 50 parts calcium nitrate dihydrate or tetrahydrate, 75 parts propane-1,2-diol and 40 parts 2,4,6-tris(dimethylaminomethyl)phenol is labelled ACBT 7Dp.

The present invention will now be illustrated by the following now-limitative Examples.

EXAMPLE I

When a mixture of an epoxy resin, epoxy equivalent 190 (70 g.), Versamid 140 (30 g.) (a polyamine/dicarboxylic acid condensate supplied by General Mills, Chemical Division, Kankakee, Ill. U.S.A.) and the accelerator system of the invention ACBV-7 (9 g.) is cured at 25° C., gelling time is 14.5 minutes. Using instead 13 g. ACBV-7, gelling time is reduced to 9.5 minutes. When carrying out the same curing reaction in presence of 10 g. DMP 30 (2,4,6-tris(dimethylaminomethyl)phenol) instead of ACBV-7, the gelling time was found to be 66 minutes.

EXAMPLE II

An "IPD/TMD adduct" was first formulated from 55 g. isophoronediamine (3-aminomethyl-3,5,5-trimethylcyclohexylamine), 45 g. trimethylhexamethylenediamine (consisting of approximately equal parts of the 2,2,4- and 2,4,4-isomers), 88 g. benzyl alcohol, 12 g. salicylic acid and 40 g. epoxy resin, epoxy equivalent 190.

When a mixture of an epoxy resin, epoxy equivalent 190 (61 g.), IPD/TMD adduct (35 g.) and ACBV-7 (4 g.) is cured at 25° C., gelling time is 4 minutes. When carrying out the same curing reaction in absence of ACBV-7, the gelling time was found to be 23 minutes.

EXAMPLE III

When a mixture of an epoxy resin, epoxy equivalent 190 (10 g.), Desmocap 11 (90 g.) (a polyurethane prepolymer from Bayer A. G., Germany), dibutyl phthalate (50 g.), IPD/TMD adduct (8 g.) and the accelerator system of the invention ACBT5 (6 g.) is cured at 25° C., gelling time is 5 minutes. When carrying out the same curing reaction in absence of ACBT5, the gelling time was found to be 120 minutes.

EXAMPLE IV

This Example demonstrates the preparation of a cured epoxy resin hardener mix which contains filler.

(a) A first mixture was prepared from epoxy resin, epoxy equivalent 190 (71.5 g.), quartz flour (18.5 g.), and atomized silica (3 g.).

(b) A second mixture was prepared from IPD/TMD adduct (40 g.). quartz flour (53 g.), and atomized silica (3 g.).

(c) When ACBV-7 (7.5 g.) was admixed with the whole of the first and second mixtures, prepared in parts (a) and (b), respectively, and the whole cured at 25° C., gelling time was 12.5 minutes. In absence of any ACBV-7, the gelling time was found to be 105 minutes.

EXAMPLE V

When a mixture of an epoxy resin, epoxy equivalent 190 (66 g.), IPD/TMD adduct (33 g.) and ACBT5 (4.4 g.) is cured at 25° C., gelling time is 4.5 minutes. When carrying out the same curing reaction in absence of ACBT5, the gelling time was found to be 23 minutes.

When in any of Examples I-V, the specified aqueous accelerator systems were replaced by the substantially non-aqueous system ACBT 7Dp, similar shortening of the acceleration times was noted.

While particular embodiments of the invention have been described, it will be evident to persons skilled in the art that many variations and modifications may be made. Merely by way of illustrative example of such variations and modifications, any one, two or all three of components (a), (b) and (c) may be constituted by a mixture of ingredients within the definitions of such components recited herein. The present invention is accordingly not to be construed as limited by the embodiments which have been particularly described, rather its concept, spirit and scope will be appreciated by reference to the claims which follow.

I claim:

1. A kit for use in making a cured epoxy resin which comprises discrete components (A and B) wherein:

A is an epoxy component comprising at least one resin-forming epoxy compound in combination with an ingredient (a) consisting of at least one inorganic salt which contains nitrate ion and an ingredient (b) consisting of at least one aliphatic hydroxy compound selected from the group consisting of monohydric alcohols containing 1–10 carbon atoms, polyhydric alcohols containing 2 to 10 carbon atoms and 2–4 hydroxy groups and poly($C_2$–$C_5$-alkylene) glycols; and B is a reagent reactive with said at least one resin-forming epoxy compound and optionally comprising an ingredient (c) in the form of an aminophenol.

2. The kit defined in claim 1 wherein component (a) is selected from the group which consists of nitrates of ammonium, lithium, sodium, potassium, magnesium, calcium, strontium, barium and aluminum.

3. The kit defined in claim 2 wherein component (a) is calcium nitrate dihydrate or calcium nitrate tetrahydrate.

4. The kit defined in claim 1 wherein component (b) is selected from the group which consists of ethyleneglycol, propylene glycol and glycerine.

5. The kit defined in claim 1 wherein component (c) is 2,4,6-tris(dimethylaminomethyl)phenol.

6. The kit defined in claim 1 wherein the ratio of components (a):(b):(c) is substantially 1 part (a): 1.0 to 5.0 parts (b): 0.02 to 7.5 parts (c), the amount of component (a) being calculated as nitrate ion.

7. A composition for use in curing an epoxy resin which comprises a homogeneous accelerator system in combination with a reagent reacting with an epoxy component of an epoxy resin, said accelerator system consisting essentially of components (a), (b) and (c), wherein:

component (a) consists of at least one inorganic salt which contains nitrate ion and an ingredient;

component (b) consists of at least one aliphatic hydroxy compound selected from the group consisting of monohydric alcohols containing 1–10 carbon atoms, polyhydric alcohols containing 2 to 10 carbon atoms and 2–4 hydroxy groups and poly($C_2$–$C_5$-alkylene) glycols; and component (c) is a reagent reactive with said at least one resin-forming epoxy compound and optionally comprising an ingredient in the form of an aminophenol.

8. A method of curing an epoxy resin which comprises adding to an epoxy resin a composition which comprises a homogeneous accelerator system in combination with a reagent reactive with the epoxy resin and comprising a component (a), a component (b) and a component (c) wherein:

component (a) consists of at least one inorganic salt which contains nitrate ion and an ingredient;

component (b) consists of at least one aliphatic hydroxy compound selected from the group consisting of monohydric alcohols containing 1–10 carbon atoms, polyhydric alcohols containing 2 to 10 carbon atoms and 2–4 hydroxy groups and poly($C_2$–$C_5$-alkylene) glycols; and component (c) is a reagent reactive with said at least one resin-forming epoxy compound and optionally comprising an ingredient in the form of an aminophenol.

9. A cured epoxy resin article cured by the method of claim 8.

* * * * *